(12) United States Patent
Batra et al.

(10) Patent No.: US 8,098,159 B2
(45) Date of Patent: Jan. 17, 2012

(54) RF DEVICE COMPARING DAC OUTPUT TO INCOMING SIGNAL FOR SELECTIVELY PERFORMING AN ACTION

(75) Inventors: Naresh Batra, Saratoga, CA (US); Heena Nandu, Sunnyvale, CA (US)

(73) Assignee: Intelleflex Corporation, Santa Clara, CA (US)

(*) Notice: Subject to any disclaimer, the term of this patent is extended or adjusted under 35 U.S.C. 154(b) by 1238 days.

(21) Appl. No.: 11/423,411

(22) Filed: Jun. 9, 2006

(65) Prior Publication Data

US 2007/0285237 A1    Dec. 13, 2007

(51) Int. Cl.
*G08B 13/14* (2006.01)
(52) U.S. Cl. .................. 340/572.1; 340/10.1
(58) Field of Classification Search ............... 340/572.1, 340/693.3, 10.1
See application file for complete search history.

(56) References Cited

U.S. PATENT DOCUMENTS

| | | | | |
|---|---|---|---|---|
| 5,952,922 | A | 9/1999 | Shober | 340/572.4 |
| 6,118,379 | A | 9/2000 | Kodukula et al. | 340/572.8 |
| 6,130,612 | A | 10/2000 | Castellano et al. | 340/572.6 |
| 6,147,606 | A | 11/2000 | Duan | |
| 6,215,402 | B1 | 4/2001 | Rao Kodukula et al. | 340/572.8 |
| 6,281,794 | B1 | 8/2001 | Duan et al. | 340/572.1 |
| 6,362,738 | B1 * | 3/2002 | Vega | 340/572.1 |
| 6,366,260 | B1 | 4/2002 | Carrender | 343/866 |
| 6,412,086 | B1 | 6/2002 | Friedman et al. | 714/733 |
| 6,621,417 | B2 | 9/2003 | Duncan et al. | 340/572.1 |
| 6,873,248 | B2 | 3/2005 | Ott | 340/5.75 |
| 6,894,624 | B2 | 5/2005 | Kim et al. | 340/933 |
| 2002/0070862 | A1 | 6/2002 | Francis et al. | 340/572.1 |
| 2003/0006901 | A1 | 1/2003 | Kim et al. | 340/572.5 |
| 2003/0052539 | A1 | 3/2003 | Ott | 307/10.2 |
| 2004/0134991 | A1 | 7/2004 | Fletcher et al. | 235/491 |
| 2004/0189443 | A1 | 9/2004 | Eastburn | 340/10.1 |
| 2005/0040961 | A1 * | 2/2005 | Tuttle | 340/693.3 |
| 2005/0046567 | A1 | 3/2005 | Mortenson et al. | 340/539.13 |
| 2005/0073406 | A1 | 4/2005 | Easley et al. | 340/539.1 |
| 2005/0150949 | A1 | 7/2005 | Goel et al. | 235/383 |
| 2005/0252979 | A1 | 11/2005 | Konuma et al. | 235/492 |
| 2006/0025959 | A1 * | 2/2006 | Gomez et al. | 702/150 |
| 2007/0032261 | A1 * | 2/2007 | Boyer et al. | 455/550.1 |
| 2007/0268138 | A1 * | 11/2007 | Chung et al. | 340/572.1 |
| 2007/0290802 | A1 | 12/2007 | Batra et al. | 340/10.1 |

OTHER PUBLICATIONS

International Preliminary Report on Patentability from PCT Application No. PCT/US2007/013199 mailed on Dec. 24, 2008.
International Search Report and Written Opinion from PCT Appliczition No. PCT/US07/13199 mailed on Jun. 18, 2008.
Chinese Office Action Summary from application No. 200780016560.4 mailed on Mar. 16, 2010.

* cited by examiner

*Primary Examiner* — Shirley Lu
(74) *Attorney, Agent, or Firm* — Zilka-Kotab, PC

(57) ABSTRACT

A Radio Frequency (RF) device such as a Radio Frequency Identification (RFID) tag according to one embodiment includes a Digital to Analog Converter (DAC) for generating a reference signal based on a stored digital comparison criteria value, and a mechanism for comparing an incoming signal to the reference signal. The device performs an action such as backscattering based on the comparison. Additional systems and methods are also disclosed.

24 Claims, 7 Drawing Sheets

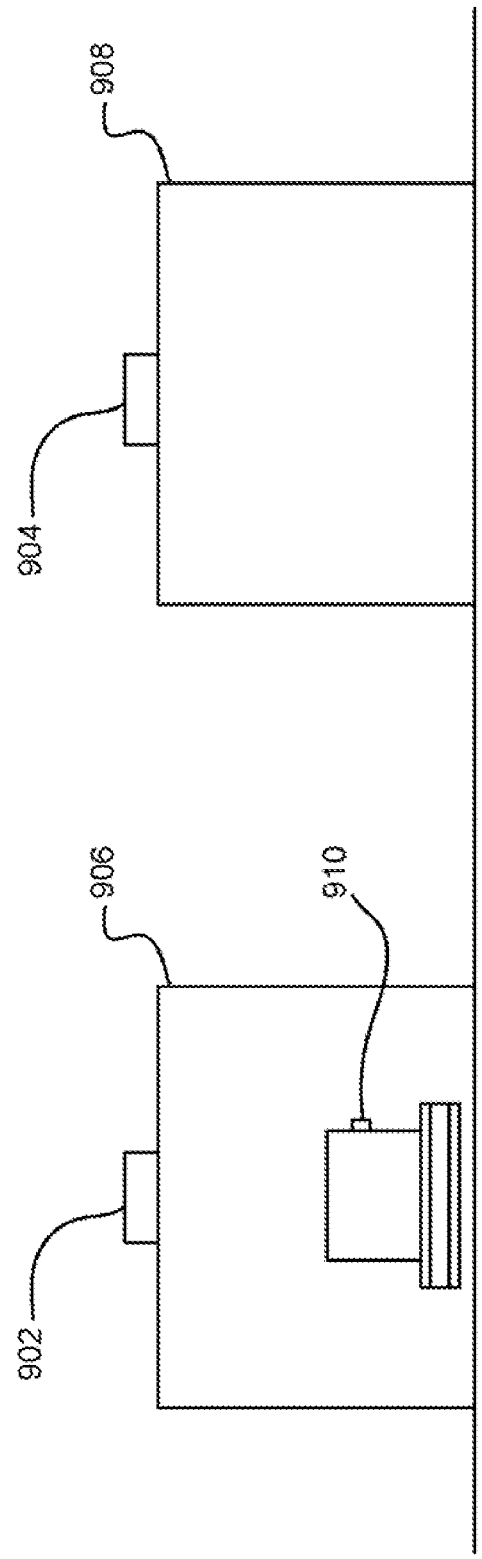

RF DEVICE COMPARING DAC OUTPUT TO INCOMING SIGNAL FOR SELECTIVELY PERFORMING AN ACTION

RELATED APPLICATIONS

This application is related to U.S. Patent Application entitled "SYSTEM, METHOD AND COMPUTER PROGRAM PRODUCT FOR CALIBRATING INTERROGATOR SIGNAL STRENGTH AND/OR TAG RESPONSE RANGE SETTING" and filed concurrently herewith, and which is herein incorporated by reference.

FIELD OF THE INVENTION

The present invention relates to Radio Frequency (RF) systems and methods, and more particularly, this invention relates to RF devices using a Digital to Analog Converter (DAC) output signal for limiting the response of the tag.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacture and product type information to be encoded into the barcode, not the unique item's serial number. The bar code on one milk carton is the same as every other making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the interrogator automatically without needing manual line-of-sight scanning or singulation of the objects.

The use of RFID tags are also quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID interrogator. This coupling is advantageous, as it precludes the need for a direct contact or line of sight connection between the tag and the interrogator.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag.

RFID tags may backscatter when even the smallest incoming signal is detected. Accordingly, where there are many tags in the vicinity of the interrogator, the interrogator is required to singulate and query each RFID tag in order to find a desired tag. In dock door or warehouse situations, where there are many readers and potentially hundred of thousands of tags, the processing time required to find a particular tag can be substantial. In most applications involving RFID, speed is a desirable characteristic. It would therefore be desirable if RFID tags could be set to selectively respond based on an interrogator signal strength.

SUMMARY OF THE INVENTION

A Radio Frequency Identification (RFID) tag according to one embodiment includes a Digital to Analog Converter (DAC) for generating a reference signal based on a stored digital comparison criteria value, and a mechanism for comparing an incoming interrogator signal to the reference signal. The tag performs an action such as backscattering based on the comparison.

A method for selectively responding to an interrogator according to one embodiment includes receiving a signal from an interrogator, comparing the signal from the interrogator to a reference signal generated by a Digital to Analog Converter (DAC), responding to the interrogator signal if the interrogator signal is greater than the reference signal, and not responding to the interrogator signal if the interrogator signal is smaller than the reference signal.

A method for setting tag response criteria according to one embodiment includes receiving a digital comparison criteria value, storing the digital comparison criteria value; and using the digital comparison criteria value to determine whether to respond to an interrogator signal.

An RFID system in which the present invention may be embodies includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use.

FIG. 9 is a representative view of a practical application of the present invention.

BEST MODE FOR CARRYING OUT THE INVENTION

Figure 1:
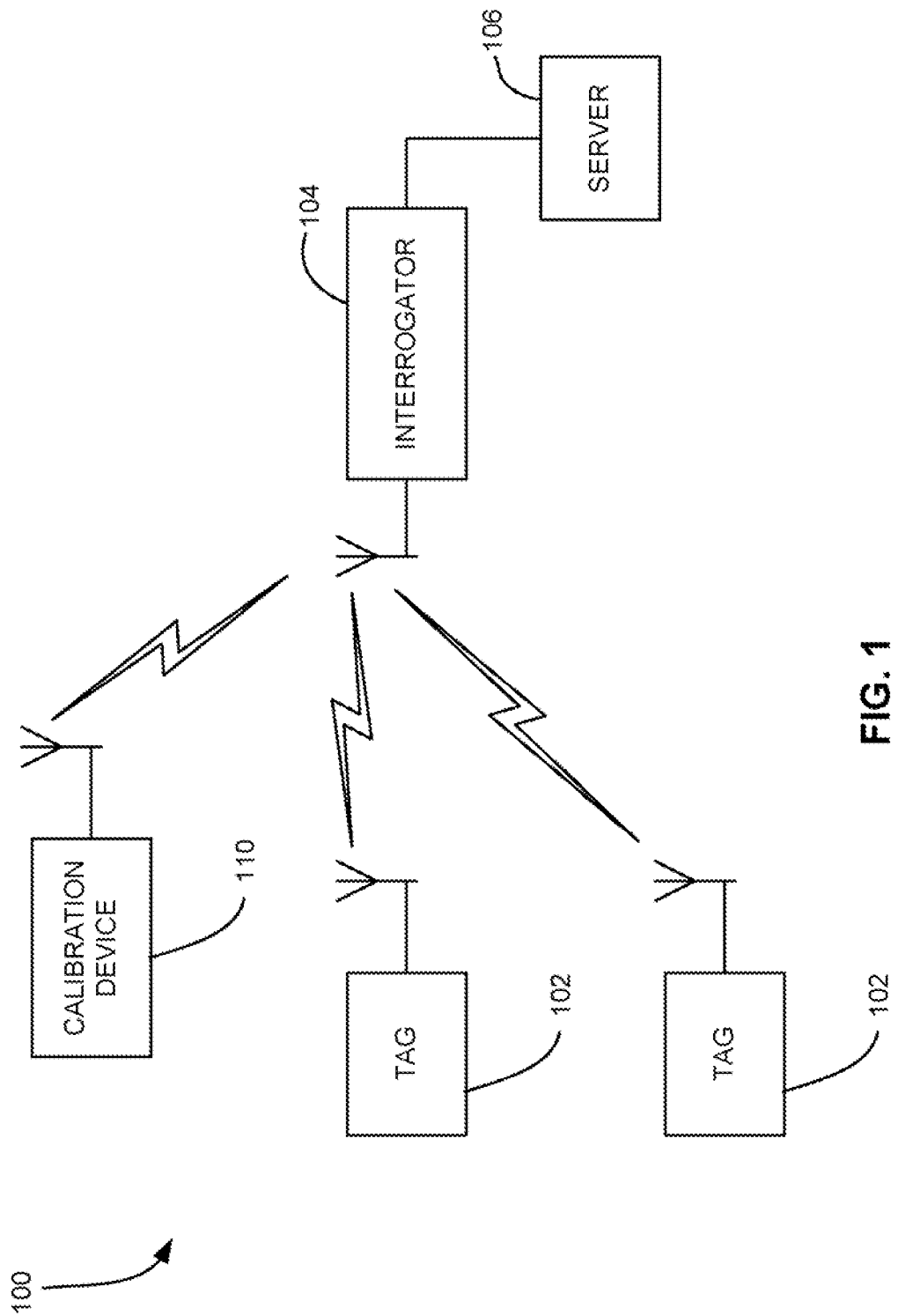
FIG. 1 is a system diagram of an RFID system according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The present invention can be portrayed in a variety of embodiments. One embodiment is a tag with a programmable Digital to Analog Converter (DAC) for selectively limiting the response of the tag based on criteria received from the interrogator or otherwise programmed into the tag. After storing the criteria in the memory of the tag, the tag may be set to respond to subsequent interrogator signals only if the incoming interrogator signal field strength meets the criteria found on the tag's memory. In another embodiment, calibrated threshold values are stored in digital memory, and a DAC is used to generate a value against which to compare the incoming signal strength.

Many types of devices can take advantage of the embodiments disclosed herein, including but not limited to RFID systems and other wireless devices/systems. To provide a context, and to aid in understanding the various embodiments, such of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, various embodiments can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon that, when executed, causes a computer or interrogator to perform the methodology disclosed herein. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag interrogator. This coupling is advantageous, as it precludes the need for a direct contact or line of sight connection between the tag and the interrogator.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag. For example, each tag may store information about the object to which coupled. A tagged object can be identified and located by identifying and locating the tag coupled to it.

As shown in FIG. 1, an RFID system 100 typically includes RFID tags 102, an interrogator or "reader" 104 and an optional server 106 or other backend system which may include databases containing information related to RFID tags and/or tagged items. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC Systems Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering system into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with an interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a server 106 for processing, storage, and/or propagation to another computing device. By tagging a variety of items, information about the nature and location of goods can be known instantly and automatically.

Many RFID systems used reflected or "backscattered" radio frequency (RF) waves to transmit information from the tag 102 to the interrogator 104. Since passive (Class-1 and Class-2) tags get all of their power from the interrogator signal, the tags are only powered when in the beam of the interrogator 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID system where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

The system 100 of FIG. 1 may also include a calibration device 110, which itself may be an RFID tag or a device capable of backscattering or otherwise transmitting a signal. The calibration device 110 and its use are discussed in detail below.

Figure 2:
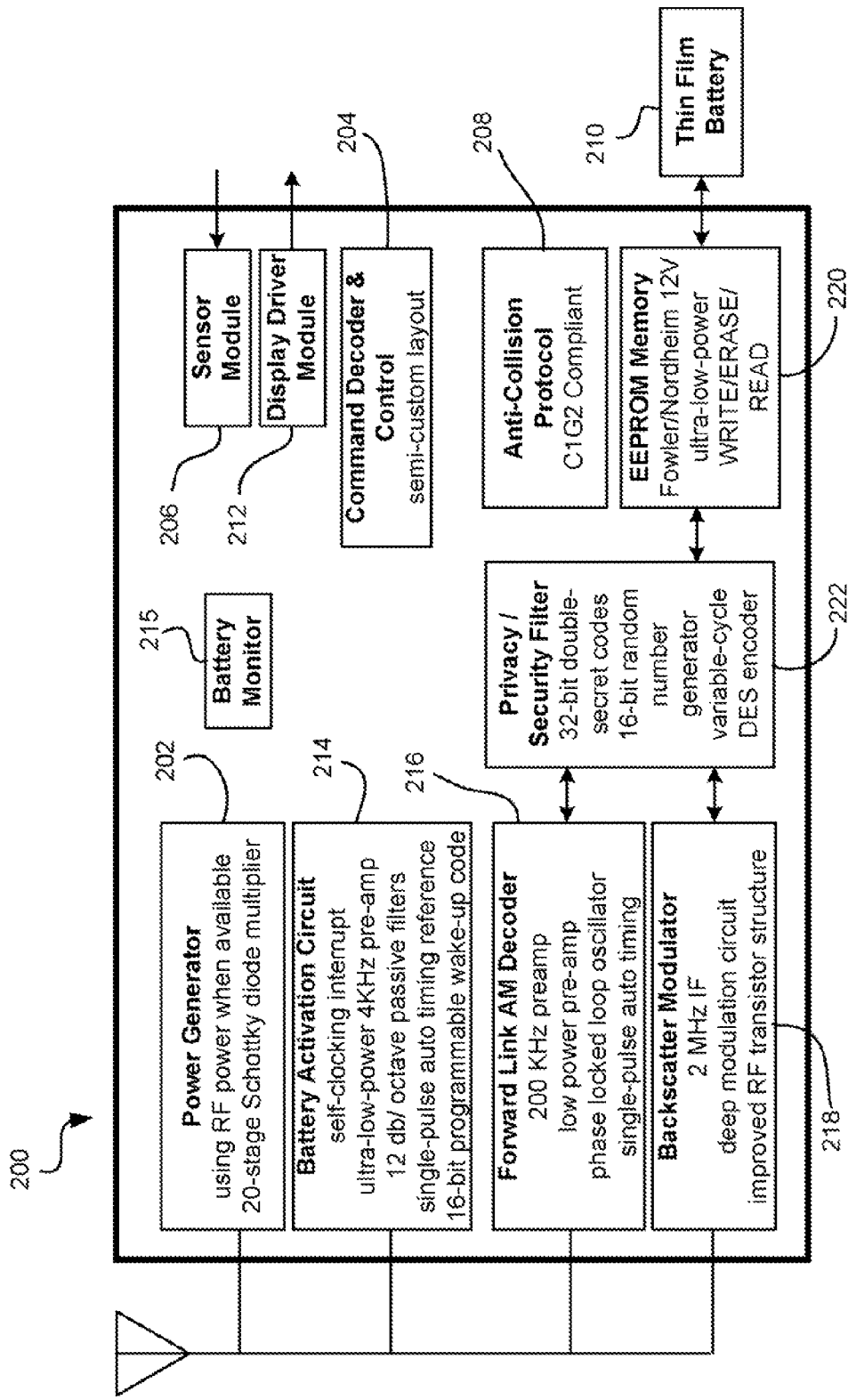
FIG. 2 is a system diagram for an integrated circuit (IC) chip for implementation in an RFID tag according to one embodiment of the present invention.

Embodiments of the present invention are preferably implemented on or in conjunction with a Class-3 or higher Class chip (processor). FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a CIG2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 μA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antennas. Sensors to monitor temperature, shock, tampering, etc. can be added by appending an industry-standard $I^2C$ or SPI interface to the core chip.

It should be kept in mind that the present invention can be implemented using any type of tag, and the circuit 200 described above is presented as only one possible implementation.

Figure 3:
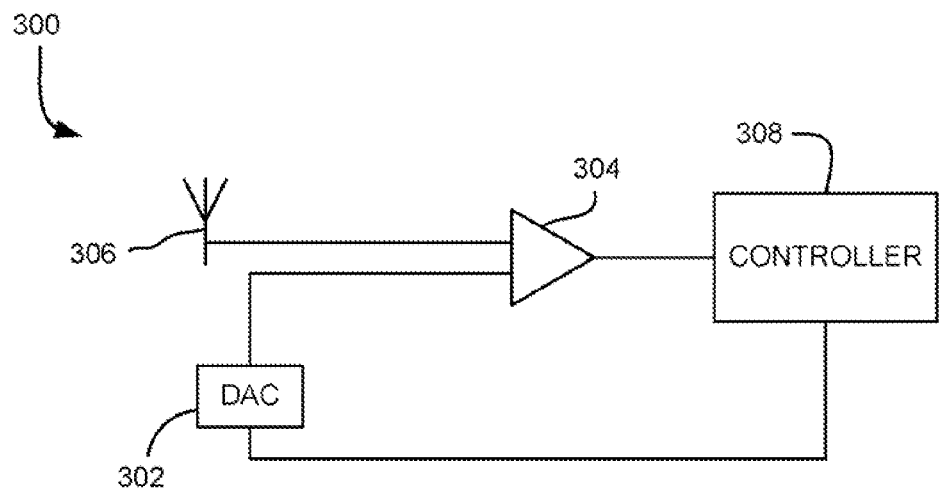
FIG. 3 is a circuit diagram of an RFID circuit with a programmable DAC according to one embodiment of the present invention.

As mentioned above, the present invention can be implemented in a variety of embodiments. FIG. 3 illustrates one embodiment of an RFID circuit 300 with a programmable DAC 302, the output of which is ultimately used to selectively limit the response of the tag based on criteria received from the interrogator or otherwise programmed into the tag. A DAC is a device used to convert a digital (usually binary) value to an analog signal. Simple switches, a network of resistors, current sources or capacitors may implement this conversion. The analog signal may comprise current, voltage or charges which, for example, can be compared to other signals, for example an interrogator signal received by the tag.

With continued reference to FIG. 3, the DAC 302 in this embodiment may be a device or circuit that is capable of storing and/or handling an n-bit digital comparison criteria value, e.g., in an on board memory, non-volatile series of latches, etc. Once the criteria value is stored in the DAC 302, the tag may be set to respond to subsequent incoming signals from interrogators, other tags, etc. only if the incoming signal field strength meets the criteria found on the tag. To accomplish this, the circuit 300 also includes a comparator 304 that compares the DAC output reference signal to a signal derived from the antenna 306. For example, a voltage derived from the incoming interrogator signal can be applied to the comparator 304, along with an analog voltage generated by the DAC 302. The comparator 304 indicates whether the signal derived from the incoming signal matches or exceeds the threshold signal from the DAC 302. If The comparator 304 indicates a match (or excess), the controller 308 or other device can instruct the tag to perform a desired operation. For example, the tag can initiate backscatter in response to the interrogator signal, the tag can emit a sound or emit a light from a light emitting diode (LED), etc.

The tag can also respond in a similar or different manner if the comparison criteria have not been met, e.g., to indicate that the tag is within range of an undesired interrogator, to indicate that the tag is out of range of a desired interrogator, etc. For example, the tag can return to hibernate state if the incoming interrogator signal is below the DAC output level.

A variation on the embodiment shown in FIG. 3 has a DAC that is not programmable, but rather the comparison criteria is permanently or semi-permanently programmed into the DAC during manufacture or tag initialization.

Figure 4:
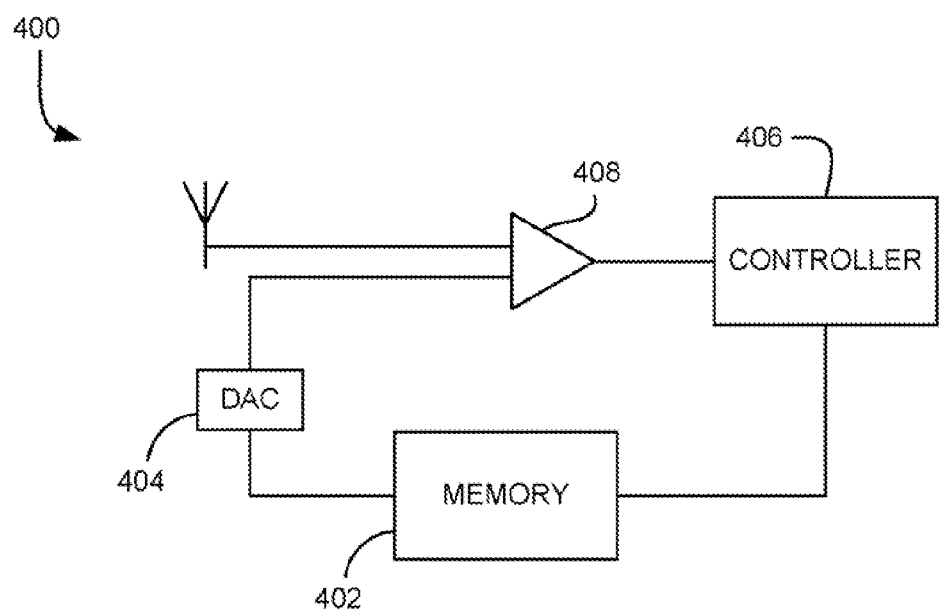
FIG. 4 is a circuit diagram of an RFID circuit with a DAC and memory according to one embodiment of the present invention.

FIG. 4 depicts another embodiment 400 in which the digital comparison criteria value is stored in the chip's digital memory 402. As above, a DAC 404 is used to generate a signal against which to compare the incoming signal strength. However, the DAC 404 receives the digital threshold value from the memory 402 at the direction of the controller 406. As above, the DAC output reference signal is compared to the incoming raw or processed interrogator signal e.g., using a comparator 408. If the incoming signal matches, exceeds, or is lower than the DAC signal, the tag can perform some action.

Figure 5:
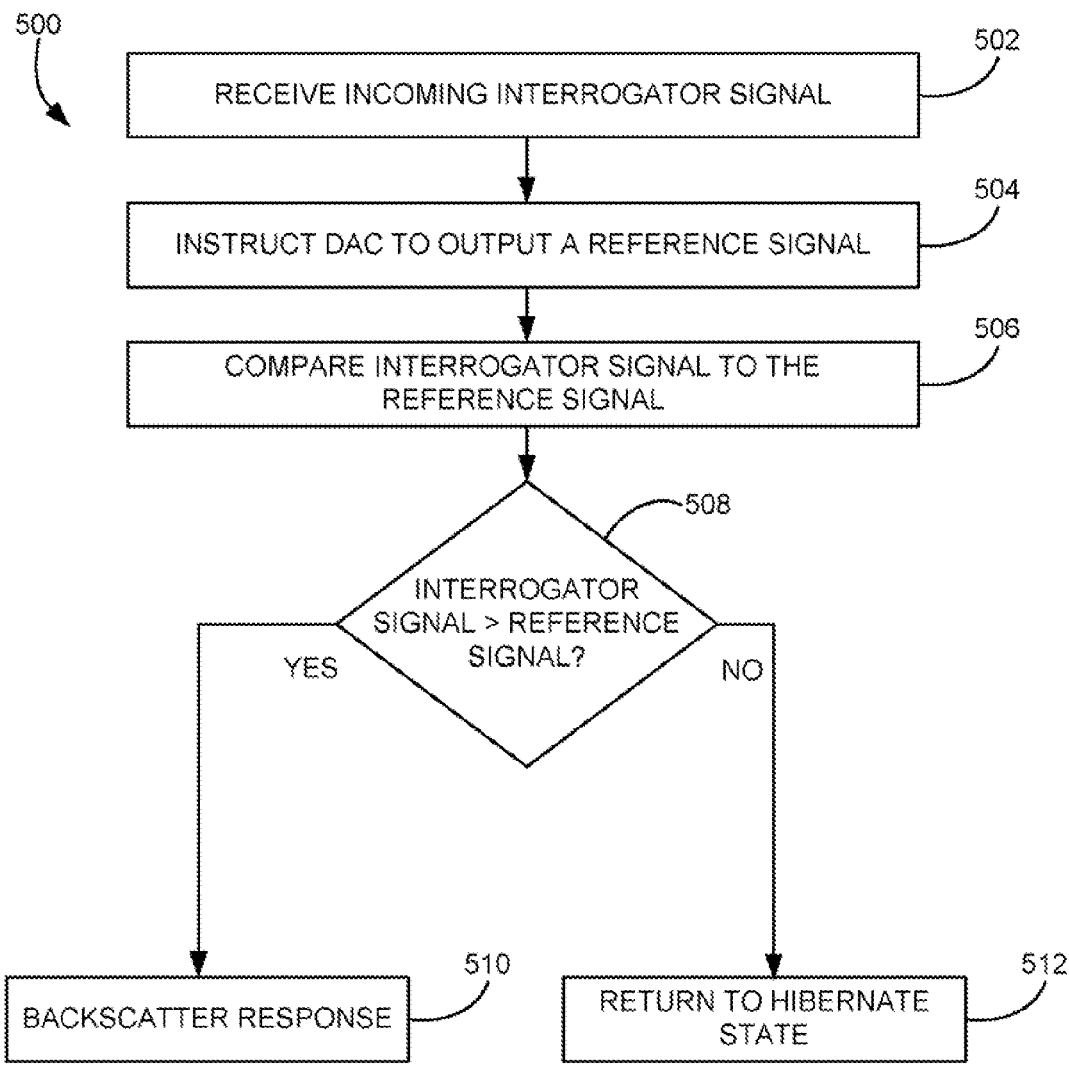
FIG. 5 is a flow diagram of a process for selectively responding to an interrogator signal based on strength of an incoming interrogator signal, according to one embodiment of the present invention.

FIG. 5 illustrates a process 500 for selectively responding to an interrogator signal based on a strength of an incoming interrogator signal, according to one embodiment. In operation 502, an incoming interrogator signal is received. In operation 504, the DAC is instructed to output a reference signal based on a digital comparison criteria value. In operation 506, the interrogator signal is compared to the reference signal. At decision 508, a determination is made as to whether the interrogator signal exceeds the reference signal. If it does, the tag backscatters a response in operation 501. If the interrogator signal does not exceed the reference signal, the tag does not backscatter and returns to a hibernate state in operation 512.

Figure 6:
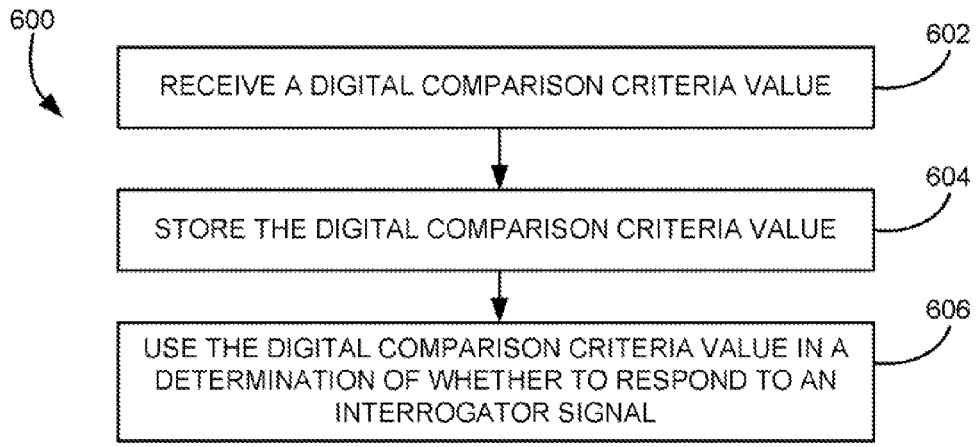
FIG. 6 is a flow diagram of a process for setting tag response criteria, as performed on the tag, according to one embodiment of the present invention.

FIG. 6 illustrates a process 600 for setting tag response criteria, as performed on the tag. In operation 602, a digital comparison criteria value is received, e.g., from an interrogator via an air interface. In operation 604, the digital comparison criteria value is stored e.g., on the DAC, in memory, etc. In operation 606, the digital comparison criteria value is used to determine whether to respond to an interrogator signal. This may entail using a DAC to generate a reference value against which the incoming interrogator signal strength is compared.

Different types and quantities of comparison criteria can be stored on the RFID tag. For example, two predefined signal levels can be stored on a memory unit located on the tag. This signal levels can include a minimum allowable interrogator signal level for tag response, maximum allowable interrogator signal level for tag response, etc.

The DAC comparison criteria can be set by a user. A tag can receive these criteria via different mechanisms, e.g. by sending an n-bit code through the air interface via the interrogator, etc. The comparison criteria can also be pre-programmed into the DAC, etc.

Authorization to change the digital comparison criteria value may be required. For example, the tag may require receipt of a passcode matching a value stored in memory prior to allowing adjustment of the comparison criteria. This ensures that unauthorized users cannot change the criteria.

Also, several tags may contain a "master" code that allows the interrogator to send a blanket command to multiple tags simultaneously, instructing them to set the comparison criteria to a specified level. Those tags storing the master code will reset the comparison criteria upon receiving the blanket request to do so. Note that some tags may have several master codes stored therein.

Figure 7:
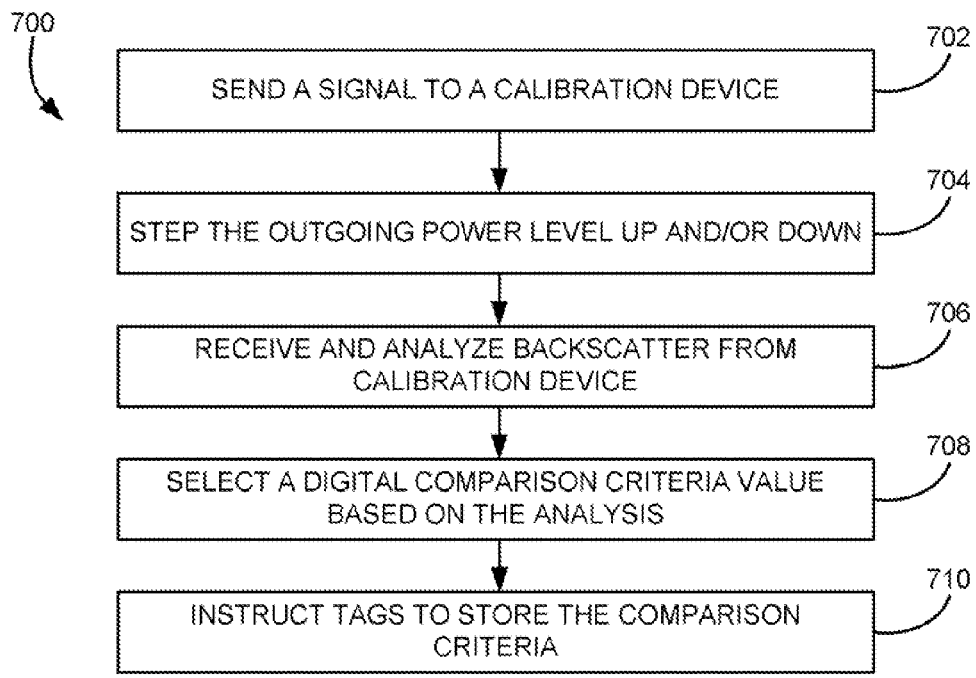
FIG. 7 is a flow diagram of a general method for setting a tag to selectively respond to an incoming interrogator signal based on its strength.

A calibration device may be used to help select the comparison criteria. Among other things, such an embodiment is useful for accounting for changes in environmental; conditions (e.g., temperature, humidity, presence of rain, presence of fog or smog, etc.) that affect RF transmissions. FIG. 7 illustrates a general method 700 for setting a tag to selectively respond to an incoming interrogator signal based on its strength. In operation 702, the RFID system interrogator sends a signal to a calibration device at a predetermined or random time, at predetermined intervals, or at random time intervals. In operation 704, the interrogator steps up and/or down the transmitting power while sending the signal or series of signals. The interrogator receives and analyzes the backscatter obtained from the calibration device at the various transmitted power levels in operation 706. Based on the analysis of the backscatter, the interrogator can select a digital comparison criteria value in operation 708. In operation 710, the interrogator instructs the various tags to store the comparison criteria. The comparison criteria value may then be used by the tag to selectively respond to an interrogator signal based on the incoming interrogator signal strength.

Calibration devices may be permanently mounted in certain locations, or may be removable and portable. However, it is desirable that an approximate distance between the calibration device(s) and the interrogator is known, as the backscatter signal strength is a function of distance from the interrogator.

Calibration devices may include, but are not limited to, devices such as powered (active and semi-passive) RFID tags or other transponders/transmitters, non-powered (passive) RFID tags or transponders, other interrogators, etc. Additionally, a calibration device may be powered by a permanent power supply, such as a transformer connected to a main power line, or may be powered by a portable power supply such as one or more batteries. The calibration device could also be powered by an alternative power source, such as solar power.

As mentioned above, the calibration device is preferably positioned at a known distance from the interrogator antenna so that consistency of results can be obtained. Ideally, the calibration device is fixed, but mobile/detachable calibration devices are also contemplated. The latter may be useful in situations, e.g., where the best location for the calibration device is physically "in the way" of other activities, or conflicts with desirable performance of an RFID system, and so should be removed after calibration is performed.

Examples of calibration device backscatter are signals containing predefined strings of data, a particular ID code (e.g., of the calibration device), a harmonic signal etc.

As mentioned previously, the calibration device backscatter can be analyzed at various time intervals. For example, backscatter can be analyzed in intervals from fractions of a second to periods of every hour or longer. Analysis can also be performed at randomly generated time increments or in response to changing environmental conditions (e.g., temperature, humidity, presence of rain, presence of fog or smog, etc.) or other predetermined events, etc.

Analysis can be performed by the interrogator itself or by another unit coupled to the interrogator, such as a server, host, PC, etc. Where applicable, the unit performing the analysis and the interrogator may be coupled through a direct network connection, wireless connection, hard-wired connection, etc.

The results of backscatter measuring and analysis may be maintained in a table. The table may also contain other data, such as historical signal data, etc. for use in optimizing algorithms, etc. An illustrative set of results is presented below:

| Interrogator outgoing signal strength | Backscatter signal strength rcvd by interrogator |
| --- | --- |
| 100 mW | 0.0 V |
| 110 mW | 0.1 V |
| 180 mW | 0.3 V |
| 200 mW | 0.5 V |
| 300 mW | 1.0 V |

Thee results of the backscatter measuring provides the backscatter signal strength generated for a given outgoing interrogator signal strength. This backscatter signal strength corresponds to the backscatter that will be generated by tags in the vicinity of the interrogator at a given power level at an approximate distance from the interrogator. For example, in the above table an interrogator transmitting a signal with a strength of 180 mW receives a backscatter signal from the calibration device measuring 0.3V at X meters, where X meters is the distance between the calibrating device and the interrogator antenna. The interrogator can then use the results of the backscatter measuring and analysis to select and set the digital comparison criteria on the tags.

EXAMPLES

Figure 8:
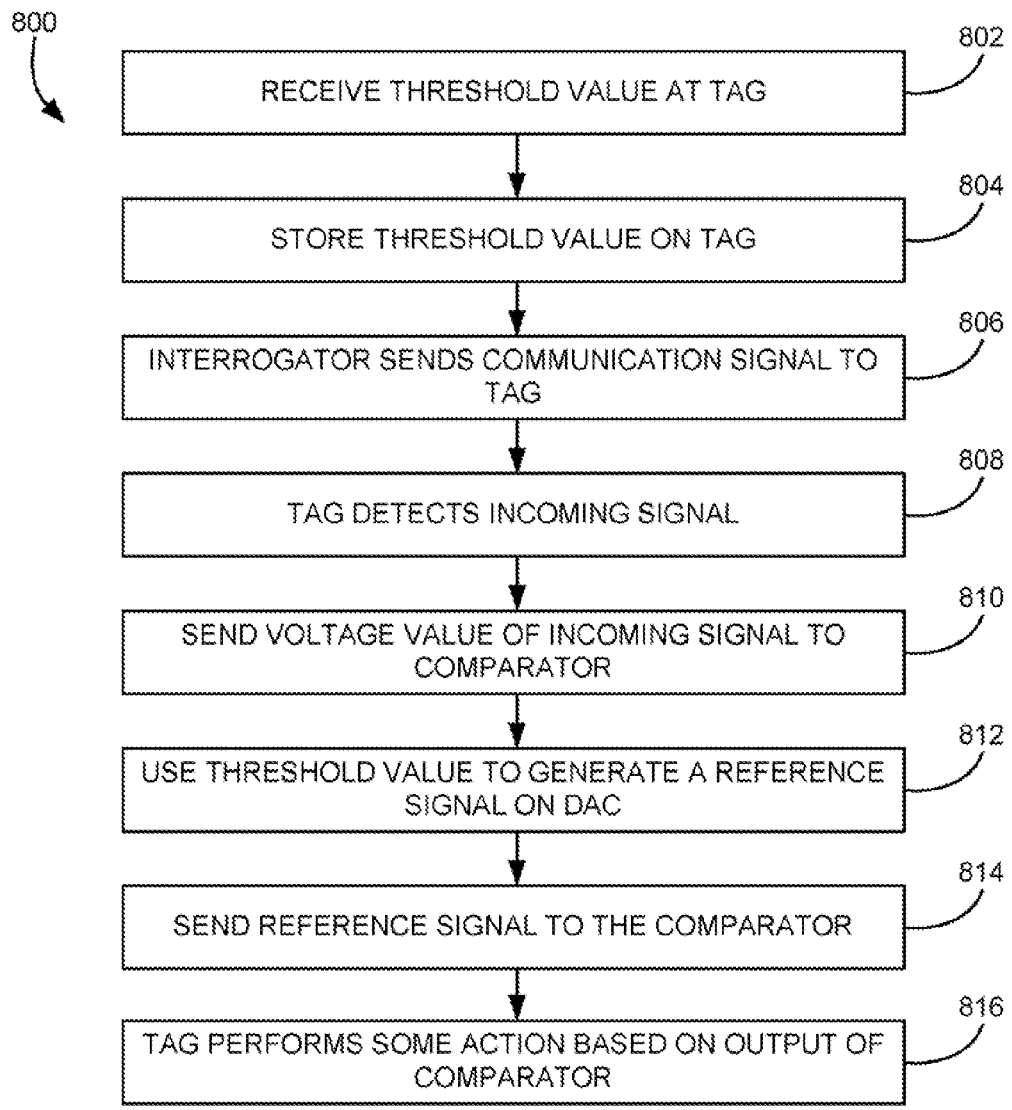
FIG. 8 is a flow diagram of a process according to an illustrative embodiment of the invention.

FIG. 8 illustrates a process 800 according to an illustrative embodiment of the invention. As shown, a digitally encoded threshold voltage value (comparison criteria) is received by a tag in operation 802. Such preprogramming may be performed at tag initialization, when the tag is in route to a destination, on the fly just prior to interrogation by an interrogator, etc. The threshold voltage value is stored in a memory unit on the tag in operation 804. After the threshold voltage value is stored in the tag's memory, an interrogator sends a communication signal to the tag in operation 806. The tag detects the incoming communication signal in operation 808. This voltage of the incoming signal is sent to a comparator located on the tag in operation 810. Simultaneously, the threshold voltage value stored in memory on the tag is converted by the DAC to an analog reference signal in operation 812. The reference signal is sent to the comparator on the tag in operation 814. The tag comparator analyzes the incoming voltage value and the converted analog threshold voltage value and outputs a HI/LO result. In operation 816, the tag performs some action based on the output of the comparator. For example, if the incoming voltage value is equal to or greater than the converted threshold voltage value, the comparator outputs a HI result, which prompts the tag to respond by sending a backscatter signal. If the incoming voltage value is less than the converted threshold voltage value, the comparator outputs a LO result, which prompts the tag to not respond to the incoming interrogator signal.

FIG. 9 depicts a practical application of the present invention. For this example, assume multiple truck lanes exist in a dock door scenario. Interrogators 902, 904 at each dock door 906, 908 desire responses from only those tags at their specific door, and not from tags located at adjacent doors. Tags 910 coming through dock door 906 receive a signal from interrogator 902 with a voltage of at least 0.5V. Tags located at dock door 906 receive a signal from interrogator 904 with a voltage less than 0.5V. Interrogator 902 may optionally send n-bit comparison criteria value through the air interface to each tag within its range, or an instruction to each tag to set its threshold value to 0.5V. After the threshold value is set, each tag will only respond to an interrogator signal having a power of at least 0.5V. As a result, when tags 910 located at dock door 906 receive a signal form interrogator 902 with a voltage of a least 0.5V, they will respond by sending a backscatter signal. If the tags 910 located at dock door 906 receive a signal from interrogator 904, with a resultant voltage of less than 0.5V, they will not respond since the threshold value is not met. However, the tags may perform some other action, such as illuminate a Light Emitting Diode (LED) to provide a visual representation in each dock of tags that are within the range of an inappropriate interrogator.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) tag, comprising:
    a Digital to Analog Converter (DAC) for generating a reference signal based on a stored digital comparison criteria value, wherein the digital comparison criteria value is remotely changeable; and
    a mechanism for comparing an incoming interrogator signal to the reference signal,
    wherein the tag performs an action based on the comparison,
    wherein the raw incoming interrogator signal is compared to the reference signal.

2. The tag as recited in claim 1, wherein the action performed by the tag is backscattering if the incoming interrogator signal is at least as great as the reference signal.

3. The tag as recited in claim 1, wherein the incoming interrogator signal has been processed prior to being compared to the reference signal.

4. The tag as recited in claim 1, wherein the DAC stores the digital comparison criteria value.

5. The tag as recited in claim 1, further comprising memory for storing the digital comparison criteria value.

6. The tag as recited in claim 1, wherein authorization is required prior to allowing a change of the digital comparison criteria value.

7. The tag as recited in claim 1, wherein the digital comparison criteria value is changed if a code is received and the received code matches a code stored on the tag, and the digital comparison criteria value is not changed if the received code does not match a code stored on the tag.

8. The tag as recited in claim 7, wherein the received code is a master code.

9. The tag as recited in claim 1, wherein more than one digital comparison criteria value is stored.

10. The tag as recited in claim 1, wherein the digital comparison criteria value has been selected based at least in part on an environmental condition.

11. The tag as recited in claim 1, wherein the digital comparison criteria value has been selected based at least in part on a backscatter response from a calibration device.

12. A Radio Frequency Identification (RFID) system, comprising:
    a plurality of RFID tags as recited in claim 1; and
    an RFID interrogator in communication with the RFID tags.

13. A method for selectively responding to an interrogator, comprising:
    receiving a signal from an interrogator;
    comparing the signal from the interrogator to a reference signal generated by a Digital to Analog Converter (DAC) based on a digital comparison criteria value, wherein more than one digital comparison criteria value used by the DAC to generate the reference signal is stored locally;
    responding to the interrogator signal if the interrogator signal is greater than the reference signal; and
    not responding to the interrogator signal if the interrogator signal is smaller than the reference signal.

14. The method as recited in claim 13, wherein the raw incoming interrogator signal is compared to the reference signal.

15. The method as recited in claim 13, wherein the incoming interrogator signal has been processed prior to being compared to the reference signal.

16. The method as recited in claim 13, wherein the DAC stores a digital comparison criteria value used by the DAC to generate the reference signal.

17. The method as recited in claim 13, wherein a memory stores a digital comparison criteria value used by the DAC to generate the reference signal.

18. The method as recited in claim 13, wherein a digital comparison criteria value used by the DAC to generate the reference signal is changeable.

19. The method as recited in claim 18, wherein authorization is required prior to allowing a change of the digital comparison criteria value.

20. The method as recited in claim 18, wherein a digital comparison criteria value used by the DAC to generate the reference signal is changed if a code is received and the received code matches a code stored on the tag, and the digital comparison criteria value is not changed if the received code does not match a code stored on the tag.

21. The method as recited in claim 13, wherein a digital comparison criteria value used by the DAC to generate the reference signal has been selected based at least in part on an environmental condition.

22. The method as recited in claim 13, wherein a digital comparison criteria value used by the DAC to generate the reference signal has been selected based at least in part on a backscatter response from a calibration device.

23. A Radio Frequency Identification (RFID) system, comprising:
    a plurality of RFID tags performing the method recited in claim 13; and
    an RFID interrogator in communication with the RFID tags.

24. A Radio Frequency (RF) device, comprising:
    a Digital to Analog Converter (DAC) for generating a reference signal based on a stored digital comparison criteria value,
    wherein more than one digital comparison criteria value used by the DAC to generate the reference signal is stored,
    wherein the digital comparison criteria value is remotely changeable,
    wherein the digital comparison criteria value is stored if a code is remotely received and the remotely received code matches a code stored on the tag, and the digital comparison criteria value is not stored if the remotely received code does not match a code stored on the tag; and
    a mechanism for comparing an incoming signal to the reference signal,
    wherein the device performs an action based on the comparison.

* * * * *

UNITED STATES PATENT AND TRADEMARK OFFICE
CERTIFICATE OF CORRECTION

| | | |
|---|---|---|
| PATENT NO. | : 8,098,159 B2 | |
| APPLICATION NO. | : 11/423411 | |
| DATED | : January 17, 2012 | |
| INVENTOR(S) | : Naresh Batra and Heena Nandu | |

It is certified that error appears in the above-identified patent and that said Letters Patent is hereby corrected as shown below:

In column 1, line 41, "manufacture" should be replaced with --manufacturer--.
In column 1, line 44, a --,-- should be added between "other" and "making".
In column 2, line 23, "hundred" should be replaced with --hundreds--.
In column 2, line 53, "embodies" should be replaced with --embodied--.
In column 3, line 61, "such" should be replaced with --much--.
In column 4, line 48, "related" should be replaced with --relating--.
In column 4, line 64, "Systems" should be replaced with --System--.
In column 5, line 13, "system" should be replaced with --systems--.
In column 5, line 33, "used" should be replaced with --use--.
In column 5, line 62, "system" should be replaced with --systems--.
In column 6, line 42, "CIG2" should be replaced with --C1G2--.
In column 6, line 56, "ultra-low power" should be replaced with --ultra-low-power--.
In column 6, line 64, --tag-- should be added between "Class-3" and "battery".
In column 7, line 58, "The" should be replaced with --the--.
In column 8, line 27, "501" should be replaced with --510--.
In column 8, line 35, a --,-- should be added between "stored" and "e.g.,".
In column 9, line 48, a --,-- should be added between "signal" and "etc.".
In column 10, line 62, after "send" insert --an--.
In column 11, line 1, "form" should be replaced with --from--.
In column 11, line 2, "of a least" should be replaced with --of at least--.

Signed and Sealed this
Tenth Day of April, 2012

David J. Kappos
*Director of the United States Patent and Trademark Office*